US012738388B2

(12) United States Patent
Petrosky

(10) Patent No.: US 12,738,388 B2
(45) Date of Patent: Sep. 15, 2026

(54) NUCLEAR FLUX THIMBLE IRRADIATION TARGET INSERTION AND RETRIEVAL MECHANISM

(71) Applicant: Westinghouse Electric Company LLC, Cranberry Township, PA (US)

(72) Inventor: Lyman J. Petrosky, Latrobe, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 740 days.

(21) Appl. No.: 17/823,725

(22) Filed: Aug. 31, 2022

(65) Prior Publication Data

US 2024/0071642 A1 Feb. 29, 2024

(51) Int. Cl.
*G21G 1/02* (2006.01)
*G21K 5/08* (2006.01)

(52) U.S. Cl.
CPC ................ *G21G 1/02* (2013.01); *G21K 5/08* (2013.01)

(58) Field of Classification Search
None
See application file for complete search history.

(56) References Cited

U.S. PATENT DOCUMENTS 3,036,492 A * 5/1962 Rao .......................... G21K 5/08 976/DIG. 443
4,408,126 A * 10/1983 Tojo ........................ H01J 37/20 250/442.11
10,631,850 B2 * 4/2020 Housman ........... A61B 17/0401
2009/0135990 A1 * 5/2009 Poon ...................... G21C 3/328 376/438
2010/0266083 A1 * 10/2010 Bloomquist ............. G21G 4/04 376/202
2011/0051872 A1 * 3/2011 Rickard ................... G21G 1/02 376/202
2013/0149647 A1 * 6/2013 Maehara ................. G21K 5/08 430/296
2017/0236603 A1 * 8/2017 Petrosky ................ G21C 3/331 376/438

(Continued)

FOREIGN PATENT DOCUMENTS

ES 2895491 T3 * 2/2022 ............... G21K 5/08
JP 2022097026 A * 6/2022

(Continued)

OTHER PUBLICATIONS

English machine translation for KR-20030029317-A (Year: 2003).*

(Continued)

*Primary Examiner* — Robert H Kim
*Assistant Examiner* — Alina Kaliszewski
(74) *Attorney, Agent, or Firm* — K&L Gates LLP

(57) ABSTRACT

A coupler for connecting an irradiation target assembly to a transfer system is provided. The coupler comprises a housing and an inner assembly. The housing comprises a distal end, a proximal end and a side section defining a cavity therein. The side section comprises a plurality of side bores extending into the cavity. The inner assembly comprises an actuator body, a return member for exerting a default axial force on the actuator body, and a plurality of friction members configured to be transversely driven by the actuator body through the plurality of side bores. The actuator body is positioned within the cavity and comprises a first section, a second section and a middle section. A coupling system comprising a coupling insert for a transfer system and a coupler for an irradiation target assembly are also provided.

20 Claims, 7 Drawing Sheets

(56) References Cited

U.S. PATENT DOCUMENTS

| | | | | |
|---|---|---|---|---|
| 2019/0108921 | A1* | 4/2019 | Heibel | G21C 23/00 |
| 2019/0156965 | A1* | 5/2019 | Miertz | F16K 5/14 |
| 2020/0075180 | A1 | 3/2020 | Onderwater et al. | |
| 2021/0287824 | A1* | 9/2021 | Heibel | G21C 23/00 |
| 2021/0366626 | A1 | 11/2021 | Heibel et al. | |
| 2023/0187093 | A1* | 6/2023 | Richter | G21C 23/00 376/202 |
| 2024/0006089 | A1* | 1/2024 | Maibach | G21C 17/108 |
| 2024/0206707 | A1* | 6/2024 | Fleury | A61B 1/0055 |

FOREIGN PATENT DOCUMENTS

| | | | | | |
|---|---|---|---|---|---|
| KR | 20010038718 | A | | 5/2001 | |
| KR | 20030029317 | A | * | 4/2003 | |
| WO | WO-2014107218 | A2 | * | 7/2014 | G21C 23/00 |
| WO | WO-2014109807 | A2 | * | 7/2014 | B65D 21/0233 |
| WO | WO-2018115705 | A1 | * | 6/2018 | H05H 6/00 |

OTHER PUBLICATIONS

English machine translation for WO-2018115705-A1 (Year: 2018).*
English machine translation for ES-2895491-T3 (Year: 2022).*
English machine translation for JP-2022097026-A (Year: 2022).*
Search Report for corresponding Taiwanese Application No. 112133147, dated Feb. 27, 2024.
International Search Report and Opinion for corresponding International Application No. PCT/US2023/031659, dated Nov. 21, 2023.

* cited by examiner

NUCLEAR FLUX THIMBLE IRRADIATION TARGET INSERTION AND RETRIEVAL MECHANISM

BACKGROUND

Irradiation target assemblies containing a parent isotope are inserted into long and narrow flux thimble tubes in an operating reactor core with a placement mechanism, and extracted therefrom with a retrieval mechanism after sufficient irradiation to produce synthetic radioisotopes. However, conventional irradiation target placement and retrieval mechanisms become radioactive themselves because they are left in place during irradiation to maintain target positioning, thereby increasing radiation dose to operators. Alternative mechanisms can require tedious manipulations, such as, for example, in-core alignment of mechanisms by the operator, and therefore, reliably placing and holding an irradiation target in the operating reactor using a mechanism suitable for traversing the limited space available in the thimble tubes proves to be a difficult endeavor. A need exists to develop alternative transfer mechanisms for irradiation targets and operating methods thereof to optimize the reliability and efficiency of synthetic radioisotope production without comprising operator safety.

SUMMARY

The following summary is provided to facilitate an understanding of some of the innovative features unique to the aspects disclosed herein, and is not intended to be a full description. A full appreciation of the various aspects disclosed herein can be gained by taking the entire specification, claims, and abstract as a whole.

In various aspects, a coupler for connecting an irradiation target assembly to a transfer system is disclosed. In some aspects, the coupler includes a housing and an inner assembly, wherein the housing is adapted to be inserted into an outer tube. In some aspects, the housing includes a distal end comprising an interface adapted to removably couple to the irradiation target assembly; a proximal end comprising an opening; and a side section defining a cavity therein. In some aspects, the side section axially extends between the proximal end and the distal end, and includes a plurality of side bores, wherein the plurality of side bores extend into the cavity. In some aspects, the inner assembly includes an actuator body positioned within the cavity of the side section, a return member for exerting a default axial force on the actuator body, and a plurality of friction members configured to be transversely driven by the actuator body through the plurality of side bores. In some aspects, the actuator body includes a first section, a second section and a middle section, wherein each of the sections of the actuator body are axially aligned with the housing. In some aspects, the first section axially extends from the middle section in a first direction and the second section axially extends from the middle section in a second direction opposing the first direction.

In various aspects, a coupling system for transferring an irradiation target assembly through an outer tube is disclosed. In some aspects, the coupling system includes a coupling insert for a transfer system and a coupler for an irradiation target assembly. In some aspects, the coupling insert includes an insertion head, and a receiving end adapted to receive a driven cable assembly of the transfer system. In some aspects, the coupler includes a housing and a brake assembly. In some aspects, the housing includes a proximal end; a distal end; and a side section defining a cavity therein. In some aspects, the proximal end of the housing includes an opening having a first diameter adapted to surround the insertion head; and a first interface adapted to slidably receive the insertion head. In some aspects, the distal end of the housing includes an interface adapted to removably couple to the irradiation target assembly. In some aspects, the side section of the housing includes a plurality of side bores transversely extending into the cavity, wherein the side section axially extends between the proximal end and the distal end of the housing. In some aspects, the brake assembly includes a plunger positioned within the cavity of the side section; a spring; and a plurality of braking balls adapted to be outwardly driven by the plunger into the outer tube. In some aspects, the plunger includes a proximal shaft, a distal shaft, and a middle section, wherein the proximal shaft and the distal shaft axially extend from the middle section, and wherein the proximal shaft of the plunger is accessible through the opening of the proximal end of the housing. In some aspects, the spring is spring positioned around the distal shaft of the plunger, wherein the spring is adapted to exert a default force on the plunger. In some aspects, the plurality of braking balls are adapted to be outwardly driven by the plunger into the outer tube. In certain aspects, the plunger is adapted to exert a transverse force on the plurality of braking balls based on the default force; the brake assembly is adapted to provide an immobilizing transverse force to the plurality of braking balls based on the default force; and the immobilizing transverse force is adapted to maintain an axial position of the coupler within the outer tube.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of any of the aspects disclosed herein.

BRIEF DESCRIPTION OF THE DRAWINGS

The various aspects described herein, together with objects and advantages thereof, may best be understood by reference to the following description, taken in conjunction with the accompanying drawings as follows.

Figure 1:
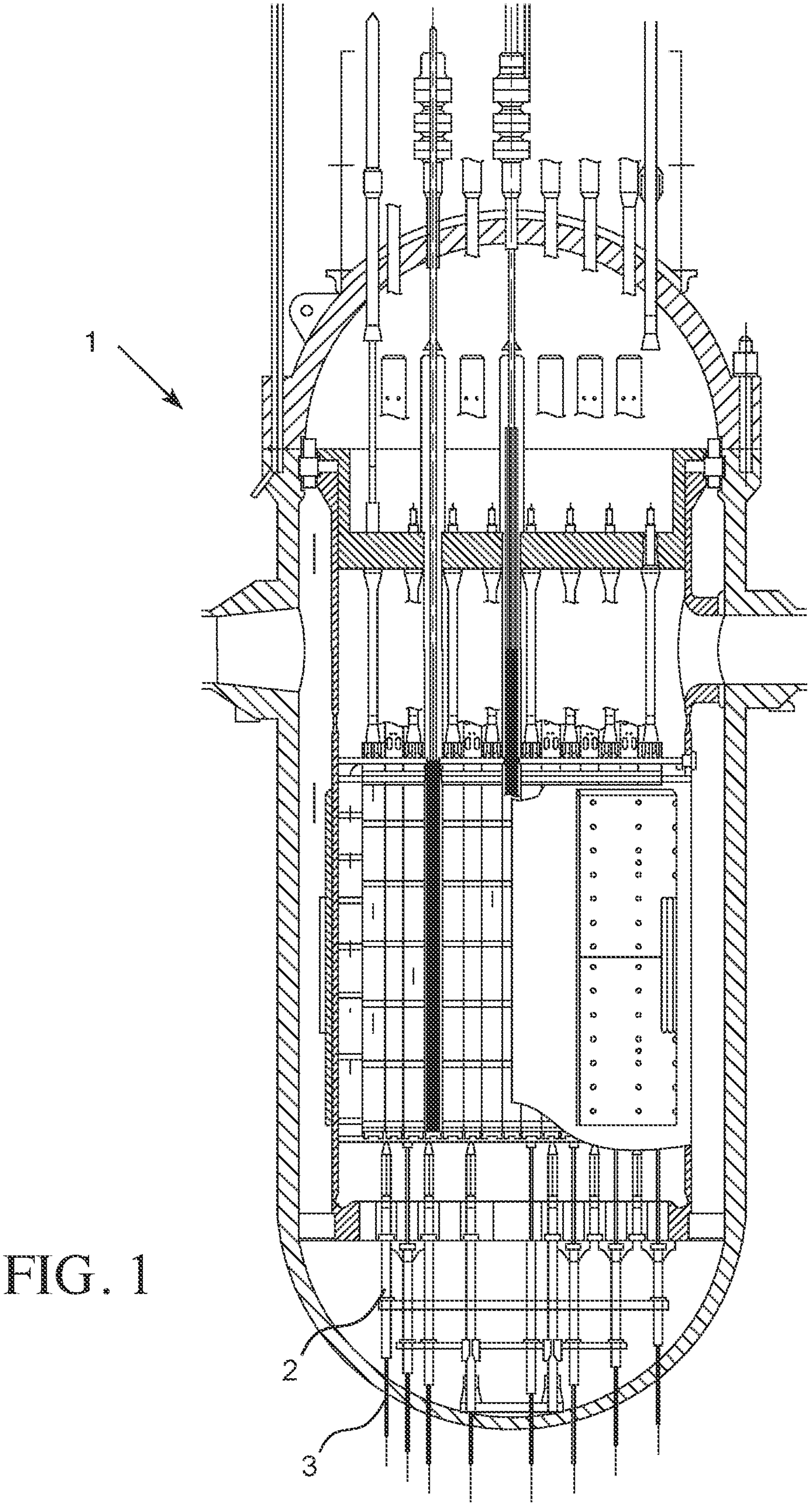
FIG. 1 is a partial cross section view of a nuclear reactor core, in accordance with at least one non-limiting aspect of the present disclosure.

Corresponding reference characters indicate corresponding parts throughout the several views. The exemplifications set out herein illustrate various aspects of the present disclosure, in one form, and such exemplifications are not to be construed as limiting the scope of any of the aspects disclosed herein.

DETAILED DESCRIPTION

Certain exemplary aspects of the present disclosure will now be described to provide an overall understanding of the principles of the composition, function, manufacture, and use of the compositions and methods disclosed herein. An example or examples of these aspects are illustrated in the accompanying drawings. Those of ordinary skill in the art will understand that the compositions, articles, and methods specifically described herein and illustrated in the accompanying drawings are non-limiting exemplary aspects of the present disclosure. The features illustrated or described in connection with one exemplary aspect may be combined with the features of other aspects. Such modifications and variations are intended to be included within the scope of the present disclosure.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

In the following description, like reference characters designate like or corresponding parts throughout the several views of the drawings. Also in the following description, it is to be understood that such terms as "forward," "rearward," "left," "right," "above," "below," "upwardly," "downwardly," and the like are words of convenience and are not to be construed as limiting terms.

The terms "proximal" and "distal" are used herein with reference to a driven end of a transfer system for the irradiation target assembly, the term "proximal" referring to the portion closest to the transfer system and the term "distal" referring to the portion located away from the transfer system.

The term "longitudinal" and "longitudinally" are used herein with reference to an axis extending through proximal and distal features, structures, or characteristics. Additionally, the terms "cross-section" and "cross-sectional" are used herein with reference to a plane normal to the axis of rotation, unless otherwise specified.

Radioisotopes are unstable isotopes of elements having excess nuclear energy. Consequently, radioisotopes emit their excess nuclear energy through various decay modes at decay rates typically characterized as half-lives. Radioisotopes are employed in various commercial applications such as, for example, nuclear medicine, food preservation, industrial manufacturing and geological dating. Medical radioisotopes are typically short lived. For example, Molybdenum-99 is a medical radioisotope having a half-life of about 66 hours. In general, medical radioisotopes are synthetically produced as induced radioisotopes. For example, a neutron flux source can be employed to induce a short-lived radioactivity in a stable isotope. In the context of a nuclear reactor, a target irradiation material comprising a stable parent isotope is placed in a target irradiation assembly and inserted into a flux thimble tube to be irradiated by the neutron flux present inside the reactor core. The target irradiation assemblies are extracted at an optimum time of irradiation to retrieve the radioisotope and prepare for shipment and/or use. Since each radioisotope has a finite shelf-life regarding activity level, both the monetary and intrinsic value of a produced radioisotope can be directly impacted by the efficiency of the insertion and withdrawal procedures.

FIG. 1 shows a cross section view of a nuclear reactor core 1, in accordance with at least one non-limiting aspect of the present disclosure. The flux thimble tubes 2 in an operating nuclear reactor core 1 are typically accessed through a number of narrow penetrations 3 connected to guide tubes of a separate target transfer system. Conventional target transfer systems maintain their coupled state to the irradiation target assemblies from the time insertion into the operating reactor core through the time of retraction therefrom to provide immediate withdrawal after irradiation and to maintain the positioning of the target according to the flux distribution present inside the reactor. Thus, the components of a conventional target transfer system such as, for example, cable assemblies connected to the irradiation target assemblies, are irradiated with the target assemblies and emit ionizing radiation upon retraction into the remote seal table room where the target assemblies are retrieved. Consequently, the operators can be exposed to the harmful ionizing radiation emitted by the irradiated target transfer system. Alternative couplers to mitigate the safety hazards to operators posed by conventional transfer systems are available but cannot provide the reliability or efficiency of conventional systems during placement, irradiation and/or withdrawal stages of the radioisotope production process. For example, couplers employing twist-to-lock mechanisms for engagement are tedious to operate remotely due to the space limitations within the guide tubes of existing transfer system, which can be about 70 feet long and less than 0.25 inches in diameter. Furthermore, many of the alternative couplers can suffer from setbacks during retraction due to decoupling problems when a high retraction force is applied, such as for example, more than 50 pounds of pulling force.

Placement and retrieval of irradiation target assemblies with the abovementioned transfer systems can pose a serious safety hazard to operators. Alternative couplers are available but cannot provide the appropriate coupling strength or coupling procedures to overcome the challenges of traversing the long and narrow guide tubes of existing transfer systems. Accordingly, various aspects of the present disclosure provide various methods and devices for reliably and efficiently transferring irradiation target assemblies without sacrificing operator safety or requiring extensive modification to existing plants.

Figure 2:
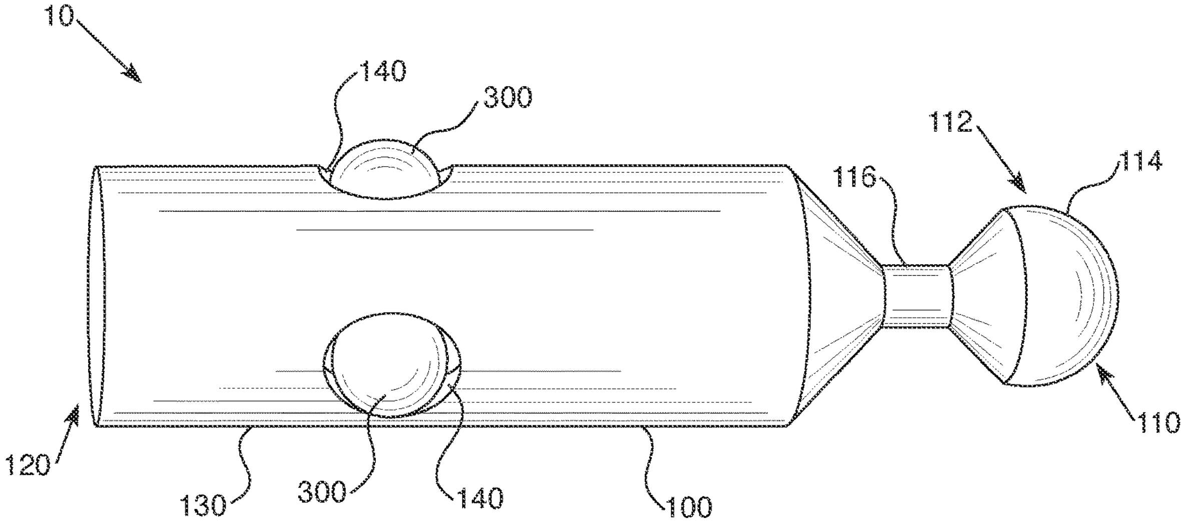
FIG. 2 is a perspective view of a coupler for an irradiation target assembly, in accordance with at least one non-limiting aspect of the present disclosure.

Now referring to FIG. 2, a perspective view of a coupler 10 for connecting an irradiation target assembly to a transfer system is provided, in accordance with at least one non-limiting aspect of the present disclosure. The coupler 10 includes a housing 100, an inner assembly, and a plurality of friction members 300. The housing 100 includes a distal end 110, a proximal end 120, a side section 130 axially extending between the proximal end 120 and the distal end 110, and a plurality of side bores 140.

In various examples, the distal end 110 includes a distal interface 112. In some examples, the distal interface 112 can include a head 114. In certain examples, the distal interface 112 can include a shank 116 proximally attached to the head. The dimensions of the distal interface 112 are configured to be smaller than the dimensions of the side section 130.

The distal interface 112 can be adapted to couple to an irradiation target assembly. For example, at least a section of the head 114 can be configured with a spheroidal, or a substantially spherical, geometry to be retained by a socket of an irradiation target assembly. In the substantially spherical configuration of the head 114, the diameter of the spherical section can be configured to be substantially the same as, or slightly smaller than the diameter of a complementary socket of an irradiation target assembly. The cross-section geometry of the shank 116 is configured to be smaller than the cross-section geometry of the head 114. The shank 116 can be configured with a cylindrical or otherwise tubular geometry. In the cylindrical geometry of the shank 116, the diameter of the shank is configured to be smaller than the cross-section geometry of the head. The configuration of the distal interface 112 can facilitate an assembly and/or disassembly of a coupler 10 and an irradiation target without compromising the range of motion or reliability of the connection.

Figure 3:
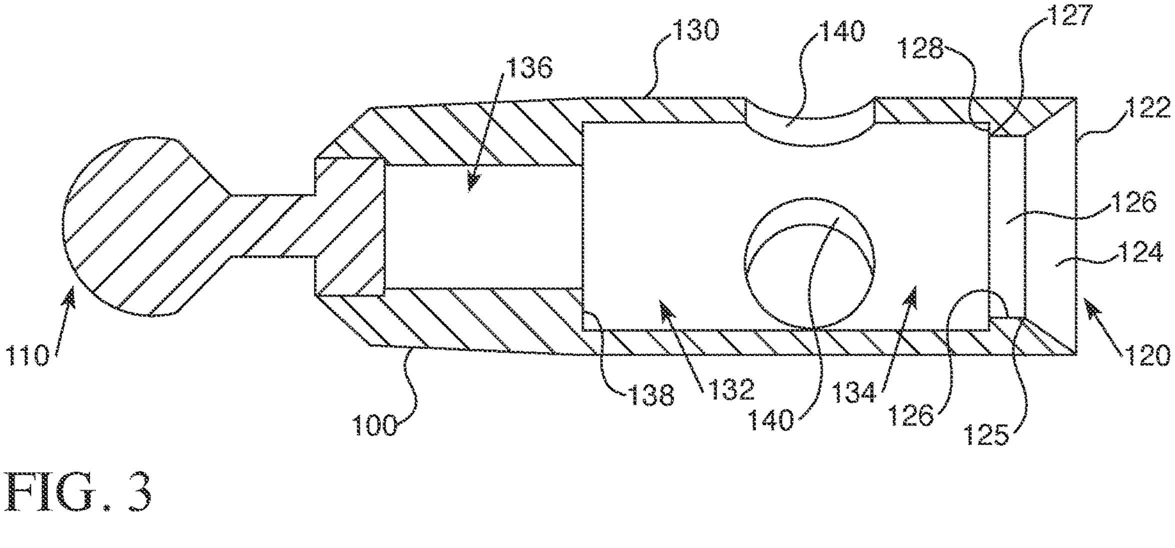
FIG. 3 is an axial cross-sectional view of a housing of a coupler for an irradiation target assembly, in accordance with at least one non-limiting aspect of the present disclosure.

FIG. 3 depicts an axial cross-section view of a housing 100, in accordance with at least one non-limiting aspect of the present disclosure. The proximal end 120 of the housing 100 includes an opening 122 in axial alignment with the housing 100. The proximal end 120 can include an intermediate region distally extending from the opening 122. In various examples, the proximal end 120 can include a first interface 124 distally extending from the opening 122 to a distal end 125 of the first interface. In some examples, the first interface 124 can be rotationally symmetric. In certain examples, the rotationally symmetric first interface 124 can include a tapered surface tapering down from a first diameter of the opening 122 to a smaller second diameter of the distal end 125. The intermediate region of the proximal end 120 can also include a second interface 126 axially extending from the distal end 125 of the first interface 124 to a distal end 127 of the second interface 126.

The dimensions and geometry of the opening 122 can be configured to surround at least a portion of a tapered section of a distally advancing insertion head of a coupling insert having a distal end and a proximal end. For example, the opening 122 can be configured with a circular geometry having a larger diameter than the diameter of a substantially circular distal end of an insertion head of a coupling insert. In one example, the opening 122 has a diameter of about 0.15 inches.

The first interface 124 can be configured with a taper. For example, the taper angle of the first interface 124 can be configured to be substantially the same as, or slightly larger than the taper angle of a tapered insertion head. In the circular configuration of the opening 122, the first interface 124 can be configured to distally taper from the diameter of the opening 122 to a distal end 125 having a smaller diameter than the diameter of the opening 122. In certain examples, the taper angle of the first interface 124 can be configured to be substantially the same as, or slightly larger than the taper angle of a rotationally symmetric tapered insertion head. Distally advancing a tapered insertion head having a suitably sized leading end into an opening 122 incorporating this configuration can result in a sliding contact between the tapered surfaces, thereby guiding the insertion head and the housing 100 into axial alignment of the insertion head and the housing 100. In some examples, the first interface 124 is configured with a taper angle of about 30 degrees, or about 20 degrees, or about 10 degrees.

The diameter of the distal end 125 of the first interface 124 can be configured to restrict an advancement of an insertion head. For example, the diameter of the distal end 125 can be configured to be smaller than the largest diameter of a tapered section of a rotationally symmetric insertion head. In this configuration, the extent of insertion beyond the distal end 125 corresponding to the point of restriction will be determined by the axial length of the portion of the insertion head leading up to the diameter of the distal end 125. Thus, a first interface 124 incorporating this configuration can receive a distally oriented force by advancing a suitably sized insertion head configured to maintain its geometry under a compression load. In one example, the distal end 125 has a diameter of about 0.1 inches.

In examples including a second interface 126, the distal end of the second interface can be configured to support a proximally oriented axial load. For example, in the circular configuration of the opening 122 the distal end of the second interface 126 may radially extend outward to form a bearing surface 128 as shown in FIG. 3. In this particular configuration, a suitable feature such as, for example, a flange, a hook or a shoulder, engaging the bearing surface 128 can provide a pulling force to retract the housing 100.

Now referring to FIGS. 2 and 3, the housing 100 is adapted to be inserted into an outer tube. For example, the cross-section geometry of the side section 130 can be configured to nest the housing 100 within an outer tube. In some examples, the side section 130 is configured with a cylindrical geometry or other tubular shape. In the cylindrical configuration of the side section 130, the outer diameter of the side section 130 can be configured to be slightly smaller than the inner cross-section geometry of a flux thimble tube and/or a guide tube of a transfer system for an irradiation target assembly. In one example, the side section 130 has an outer diameter of about 0.17 inches. The length of the housing 100 can be configured to have a length of less than 0.75 inches. A housing 100 incorporating this configuration is particularly advantageous when the irradiation target assembly must traverse a bend in the guide tubing, such as, for example, a bend having a radius of about 30 inches. Other geometries are contemplated by the present disclosure. For example, in some implementations, a side section 130 can be configured with a cubical geometry, a hexagonal prism geometry, or a rectangular-prism geometry.

Now referring back to FIG. 3, the side section 130 defines a cavity 132 therein. The cavity 132 is axially aligned with the housing 100. Each of the plurality of side bores 140 are configured to transversely extend into the cavity 132. In some examples, the cavity includes a primary section 134 and a secondary section 136. In the examples where the cavity 132 includes the sections 134 and 136, each of the plurality of side bores 140 are configured to transversely extend into the primary section 134.

The sections 134 and 136 can be configured as cylindrical bores having different diameters. In the cylindrical configuration of the cavity sections, the diameter of the primary section 134 can be configured to have a larger diameter than the secondary section 136. In this configuration, the primary section 134 can abut the secondary section 136 to form an intermediate shoulder 138 having an outer diameter of the primary section and an inner diameter of the secondary section. In some examples, the primary section 134 is positioned proximally to the secondary section 136. Other geometries are contemplated by the present disclosure. For example, in some implementations, the cross-section of each of the sections 134 and 136 can independently be configured with a hexagonal cross-section, a rectangular cross-section or any suitable polygonal cross-section.

Figure 4:
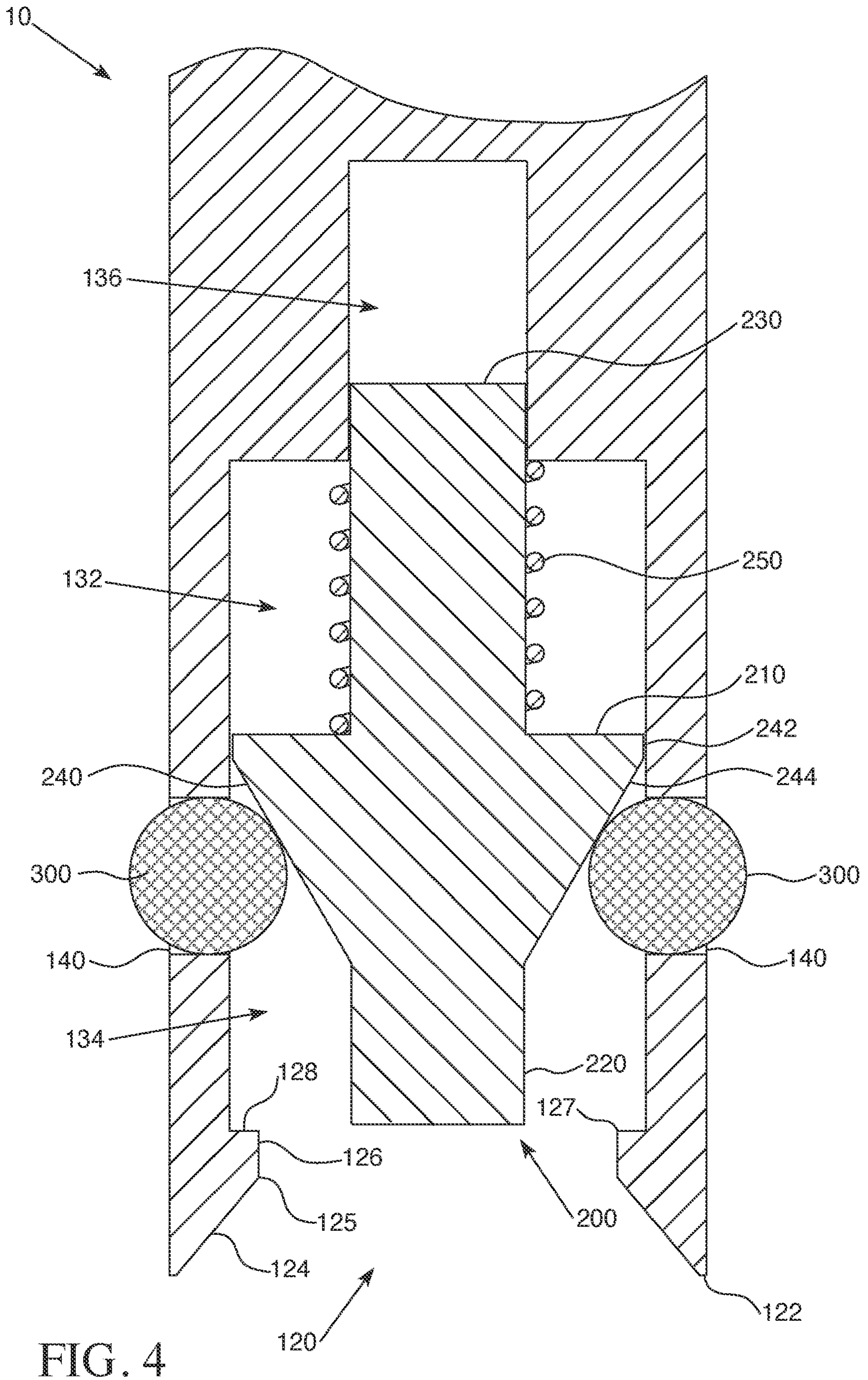
FIG. 4 is a partial cross-sectional schematic representation of a coupler for an irradiation target assembly, in accordance with at least one non-limiting aspect of the present disclosure.

FIG. 4 depicts a partial cross-sectional schematic representation of a coupler 10 including an inner assembly 200, in accordance with at least one non-limiting aspect of the present disclosure. The inner assembly 200 is positioned with the cavity 132, and includes an actuator body 210 and a return member 250 for exerting a default axial force on the actuator body 210. The actuator body 210 includes a first section 220, a second section 230 and a middle section 240. In various examples, the first section 220 axially extends in a first direction from the middle section 240, and the second section 230 axially extends from the middle section 240 in a second direction opposing the first direction. In some examples, the first direction is proximally oriented and the second direction is distally oriented. In certain examples, the actuator body 210 can be configured as a plunger wherein the middle section 240 includes a shoulder 242 and a tapered section 244, the first section 220 is configured as a proximal shaft extending from the smaller end of the tapered section 244, and the second section 230 is configured as a distal shaft extending from the shoulder 242. In the plunger configuration of the actuator body 210, the plunger can be rotationally symmetric.

The actuator body 210 can be configured to slide along the axis of the cavity 132. For example, in the plunger configuration of the actuator body 210, the distal shaft can be configured as a cylindrical shaft having a diameter substantially the same as, or slightly smaller than, the diameter of a distally positioned cylindrical secondary section 136 of the cavity 132. In this configuration, the diameter of the shoulder 242 can be configured to be substantially the same as, or slightly smaller than, the diameter of a proximally positioned primary section 134 of the cavity 132. An actuator body 210 incorporating this sliding configuration can maintain an axial alignment of the actuator body and the cavity 132 upon an axial displacement of the plunger.

Still referring to FIG. 4, the return member 250 is adapted to provide the default axial force from a stored energy. For example, the return member 250 can be configured as an elastic member for storing mechanical energy when subjected to a deformation stress and releasing the mechanical energy upon a removal of the deformation stress. In various examples, the return member 250 can include a helical spring. In some examples, the return member 250 includes a helical compression spring. The positioning of the return member 250 can be configured to exert a default axial force on the actuator body 210 in the first direction. For example, in the sliding plunger configuration of the actuator body 210, the return member 250 can be configured as a helical compression spring axially positioned between the shoulder 242 and the distal end of the cavity to resist a distal displacement of the plunger. Additionally, the inner diameter of the helical compression spring can be configured to be substantially the same as, or slightly larger than, the diameter of the distal shaft of the plunger while the outer diameter of the spring can be configured to be smaller than the diameter of the shoulder 242. In this configuration, the positioning of the return member 250 can be substantially limited to a radially centered position while maintaining contact with the shoulder 242 and the intermediate shoulder 138, thereby always exerting a proximally oriented axial force on the actuator body and/or a distally oriented axial force on the housing 100. Other configurations are contemplated by the present disclosure. For example, in some implementations, the return member 250 can be configured to include an extension spring, a disc spring, a magnetic return member, or a combination of return members.

The actuator body 210 can be configured to receive a net axial force comprising a secondary force in combination with the default force provided by the return member 250. For example, in the sliding plunger configuration of the actuator body 210, the proximal end of the proximal shaft can be configured with a cylindrical geometry having an outer diameter substantially the same as, or slightly smaller than, a cylindrical depression of a leading end of an insertion head. Upon distally advancing the insertion head having a centered cylindrical depression through the opening 122 to engage the proximal shaft, any subsequent advancement of the insertion head will result in a distally oriented contribution to the net axial force on the actuator body. Thus, the net axial force can be configured to always include a default force provided by the return member 250 while a secondary axial force for counteracting the default force can be introduced as desired. A removal of the second axial force thereafter returns the actuator body 210 to the state prior to receiving the distally oriented second axial force.

Still referring to FIG. 4, a net axial force exerted on the actuator body 210 can be used to exert a transverse force onto a separate component. For example, in the rotationally symmetric sliding plunger configuration of the actuator body 210, a proximal displacement of the tapered section 244 from the default axial force applied to the plunger will decrease the area of an annular void between an outer circle fixed at a reference axial position and the circumference of the cross-section of the tapered surface crossing the outer circle. Thus, an object positioned within this annulus at the reference axial position will receive a transverse force as the displacement continues and/or the default transverse force is increased. Uniformly distributing a plurality of objects axially fixed around a common axial position can encourage a uniform distribution of the transverse force provided by the tapered section 244.

Now referring to FIGS. 2-4, the plurality of friction members 300 are configured to be driven by the middle section 240. For example, in the cylindrical configuration of the cavity sections 134 and 136, the plurality of side bores 140 can be radially oriented and uniformly distributed around a common axial position in the primary section 134 within the boundaries of the stroked path of the tapered section 244. Additionally, the dimensions of each of the plurality of friction members 300 are configured to be slightly smaller than the diameter of the side bores 140 to minimize variation in axial positioning between each of the plurality of friction members without inhibiting a radial displacement of the friction members. In this configuration, the plurality of friction members can include at least 3 friction members. A consistent axial positioning of each of the plurality of friction members 300 can encourage a uniform distribution of transverse force provided by the tapered section 244 while the side bores can direct the radial displacement of the friction members.

In some examples, each of the plurality of friction members 300 are configured with a spheroidal or substantially spherical geometry. The spherical configuration of each friction member can minimize binding between the friction member and a side bore and/or the tapered surface of the middle section, thereby facilitating an outward displacement of each friction member through a respective side bore. In some examples, the plurality of friction members 300 includes a metal sphere. In certain examples, the plurality of friction members 300 can comprise a steel alloy.

The magnitude of radial force applied to the plurality of friction members 300 can be configured to provide an automatic braking action. In the spring configuration of the return member 250, the spring rate of the spring can be configured to provide a default force corresponding to a braking force between the plurality of friction members 300 and an outer tube surrounding the coupler 10. The braking force required to provide this automatic braking action can be based on the weight of the coupler 10 and any irradiation target assembly attached thereto. In certain examples, the spring rate of the return member 250 is configured to provide a greater friction force than required to provide the self-braking action. In this configuration, the difference between the maximum friction force and the force required to provide the brake provides a threshold force that must be surpassed by an opposing force in order to release the braking friction members 300. Thus, the threshold force can be configured to provide a desired brake release sensitivity to ensure the brake state is not accidentally disengaged. Accordingly, a coupler 10 incorporating this configuration can provide the benefits of easily optimizable irradiation target positioning within the reactor core and decreased operator exposure to ionizing radiation by providing a reliable and easily releasable self-braking mechanism.

Figure 5:
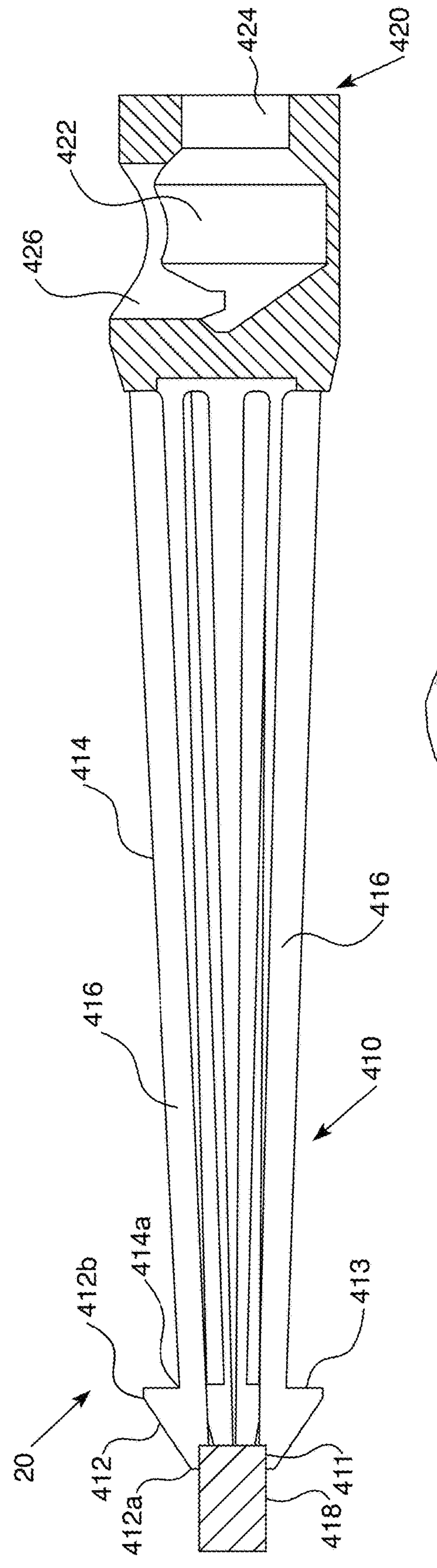
FIG. 5 is a plan view of a coupling insert for a transfer system, in accordance with at least one non-limiting aspect of the present disclosure.

FIG. 5 depicts a plan view of a coupling insert 20, in accordance with at least one non-limiting aspect of the present disclosure. The coupling insert 20 includes an insertion head 410 and a receiving end 420 in axial alignment with each other. The cross-section geometry of the coupling insert 20 is sized to be slightly smaller than the inner diameter of a guide tube of a transfer system. Thus, the coupling insert 20 can traverse the length of the guide tube of the transfer system.

In various examples, the insertion head 410 includes a tapered section 412 having a smaller distal end 412*a* and a larger proximal end 412*b*. In some examples, the insertion head 410 can include an intermediate member 414 positioned between the tapered section 412 and the receiving end 420 in axial alignment. In certain examples, the insertion head 410 can define a distally positioned void 411 therein, the void 411 proximally extending from the distal end 412*a* to a proximal end of the void 411. The proximal end of the void 411 is distally positioned with respect to the proximal end 412*b* of the tapered section.

The insertion head 410 can be configured to be inserted into a housing 100 of a coupler 10. For example, the taper angle of the tapered section 412 can be configured to be substantially the same as, or slightly smaller than, the taper angle of a tapered first interface 124. Additionally, at least a portion of the insertion head 410 can be sized with a cross-section geometry smaller than the diameter of an opening 122. The insertion head 410 can optionally include a tip 418 distally extending past the distal end 412*a*. The length of the tip 418 can be configured to provide any desired maximum insertion depth into a cavity 132.

In some examples, the insertion head 410 is configured as a segmented body having three or more axially oriented fingers 416 separated by elongated voids substantially spanning the length of the insertion head 410. In one example, the segmented insertion head 410 can comprise a high strength material such as, for example, a steel alloy. The interface between the void 411 and the elongated voids can form an internal shoulder as shown in FIG. 4. The elongated voids provide the space for an inward deflection of the fingers 416. Thus, compressing an insertion head 410 incorporating this configuration can result in a momentary inward deflection of the fingers 416. The extent of deflection of each finger 416 is dependent the total amount of fingers, the overall direction and magnitude of the compressive force, and the cross-section geometry of any member present in a void 411 such as, for example, a tip 418. Other configurations are contemplated by the present disclosure. For example, in other implementations, the insertion head can be configured as a substantially incompressible body.

Now referring to FIGS. 3-5, the cross-sectional geometry of the insertion head 410 can be rotationally symmetric. For example, at least a portion of the insertion head 410 can be configured to have a substantially circular cross-section geometry. In various examples, an outer diameter D of the insertion head 410 varies along an axial length of the insertion head 410. In some examples, the tapered section 412 can be configured to form a partial cone wherein the larger proximal end 412*b* is configured as a circular base of the conical tapered section 412 having an outer diameter greater than the diameter of the distal end 125 of a first interface 124. In examples where the insertion head 410 includes an intermediate member 414, the intermediate member 414 can be configured to abut the circular proximal end 412*b* with a circular distal end 414*a* having a smaller diameter than the circular proximal end 412*b*, thereby forming a shoulder 413 having an inner diameter defined by the distal end 414*a* and an outer diameter defined by the proximal end 412*b*. In the segmented configuration of the insertion head 410, the outer diameter D is represented by the diameter of a circumscribed circle passing through the outermost radial portion of each of the fingers 416 at a given axial position in an uncompressed state. In a compressed state, the diameter of a circumscribed circle passing through the outermost radial portion of each of the fingers 416 at a given axial position is represented by an outer diameter $D_{comp}$.

Distally advancing a substantially circular insertion head 410 through the opening 122 of a housing 100 can result in a sliding contact of at least a portion of the tapered section 412 and the tapered first interface 124 until a first advancement point, wherein a portion of the tapered section 412 larger than the diameter of the distal end 125 reaches the distal end 125. At this first advancement point, the tapered section 412 and the tapered first interface 124 will share multiple radial contact points resulting in an axial alignment thereof, and any further advancement of the insertion head 410 into the housing 100 will be restricted and/or impart a radially inward force onto at least the portion of the insertion head 410 in contact with the tapered first interface 124. If the length of a tip 418 is configured to engage a proximal shaft of an actuator body 210 just prior to reaching the first advancement point, applying a distally oriented axial force onto an incompressible insertion head 410 after reaching the first advancement point can impart a distally oriented secondary force onto the actuator body 210, thereby counteracting the default force on the actuator body to release a brake state of the coupler 10. Thus, an incompressible insertion head 410 incorporating this configuration can be implemented to distally advance a coupler 10 through a transfer system and/or a guide tube with a simple axial insertion of coupling insert 20 into a housing 100 without compromising the withdrawal of the coupling insert 20 after positioning the coupler 10.

Still referring to FIGS. 3-5, in examples of an insertion head 410 where a tip 418 is not included, sustaining a distally oriented axial force onto a compressible segmented insertion head 410 after reaching the first advancement point can result in a substantially uniform radially inward deflection of each finger 416, wherein the diameter $D_{comp}$ of any portion of the insertion head 410 in contact with the distal end 125 of the first interface 124 is compressed to a diameter $D_{comp125}$ substantially the same as the diameter of a distal end 125. Thus, a larger proximal end 412*b* of a compressible insertion head 410 compressed to a diameter $D_{comp125}$ can be advanced through a second interface 126. Upon advancing the larger proximal end 412*b* of a compressible insertion head 410 past a second advancement point wherein the larger proximal end 412*b* is radially aligned with the distal end 127 of the second interface 126, an intermediate member 414 of the insertion head 410 can expand to a diameter $D_{comp125}$ so that the shoulder 413 can engage the bearing surface 128 to provide a positive lock between the coupler 10 and the coupling insert 20. Furthermore, the size and geometry of the void 411 and the internal shoulder formed thereby can be configured to engage a proximal shaft of an actuator body 210 just prior to reaching the second advancement point, and a subsequent advancement of the insertion head 410 can impart a distally oriented secondary force onto the actuator body 210, thereby counteracting the default force on the actuator body to release a brake state of the coupler 10. A proximally oriented pulling force applied thereafter onto a compressible insertion head 410 can be transferred to the coupler 10 via the bearing surface 128 while maintaining the secondary force on the actuator body 210. The contact area between a bearing surface 128 and a shoulder 413 can be configured to provide a maximum pulling force of more than 50 pounds, or more than 75 pounds, or more than 100 pounds, or more than 125 pounds, or more than 150 pounds, or up to about 200 pounds of force. Thus, a coupling insert 20 incorporating this configuration can be inserted into a coupler 10 with a simple axial insertion to release a brake state of the coupler 10 and retract the coupler 10 through a guide tube of a transfer system thereafter without any risk of decoupling.

Figure 6:
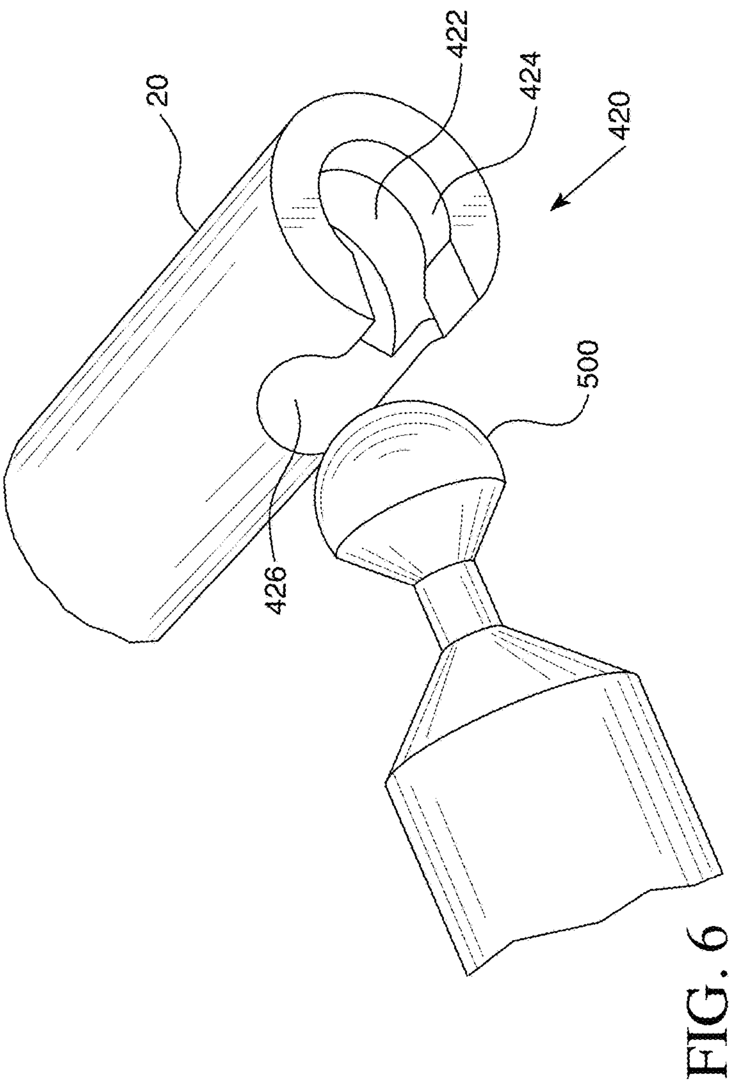
FIG. 6 is a partial perspective view of a coupling insert for a transfer system, in accordance with at least one non-limiting aspect of the present disclosure.

FIG. 6 depicts a partial perspective view of a coupling insert 20 for a transfer system, in accordance with at least one non-limiting aspect of the present disclosure. The receiving end 420 can be adapted to receive a driven cable assembly of the transfer system. For example, the receiving end can be configured as a socket for receiving a driven end 500 of a transfer system. In some examples, the receiving end 420 includes a spheroidal socket 422 for a ball and socket coupling system and an axially oriented channel 424 as shown in FIGS. 5 and 6. The diameter of the axially oriented channel 424 is configured to be substantially smaller than the diameter of the spheroidal socket 422 to retain an inserted ball upon applying a pulling force on the coupling insert with the cable assembly. In some examples, the receiving end 420 includes a radially oriented channel 426 intersecting the socket 422 and the axially oriented channel 424. The profile of the radially oriented channel 424 can be configured to be substantially the same as, or slightly larger than, the axial cross-section profile of a ball interface of a driven end of a transfer assembly. This particular configuration can facilitate assembly and/or disassembly of the ball and socket system outside of a guide tube of the transfer system by allowing a ball of a driven end 500 of a transfer system to be easily inserted into the socket via the radially oriented channel as illustrated in FIG. 6, while preventing a decoupling when positioned within a guide tube of the transfer system due to the lack of necessary radial clearance between the receiving end 420 and the inner wall of the guide tube required for disassembly.

Figure 7:
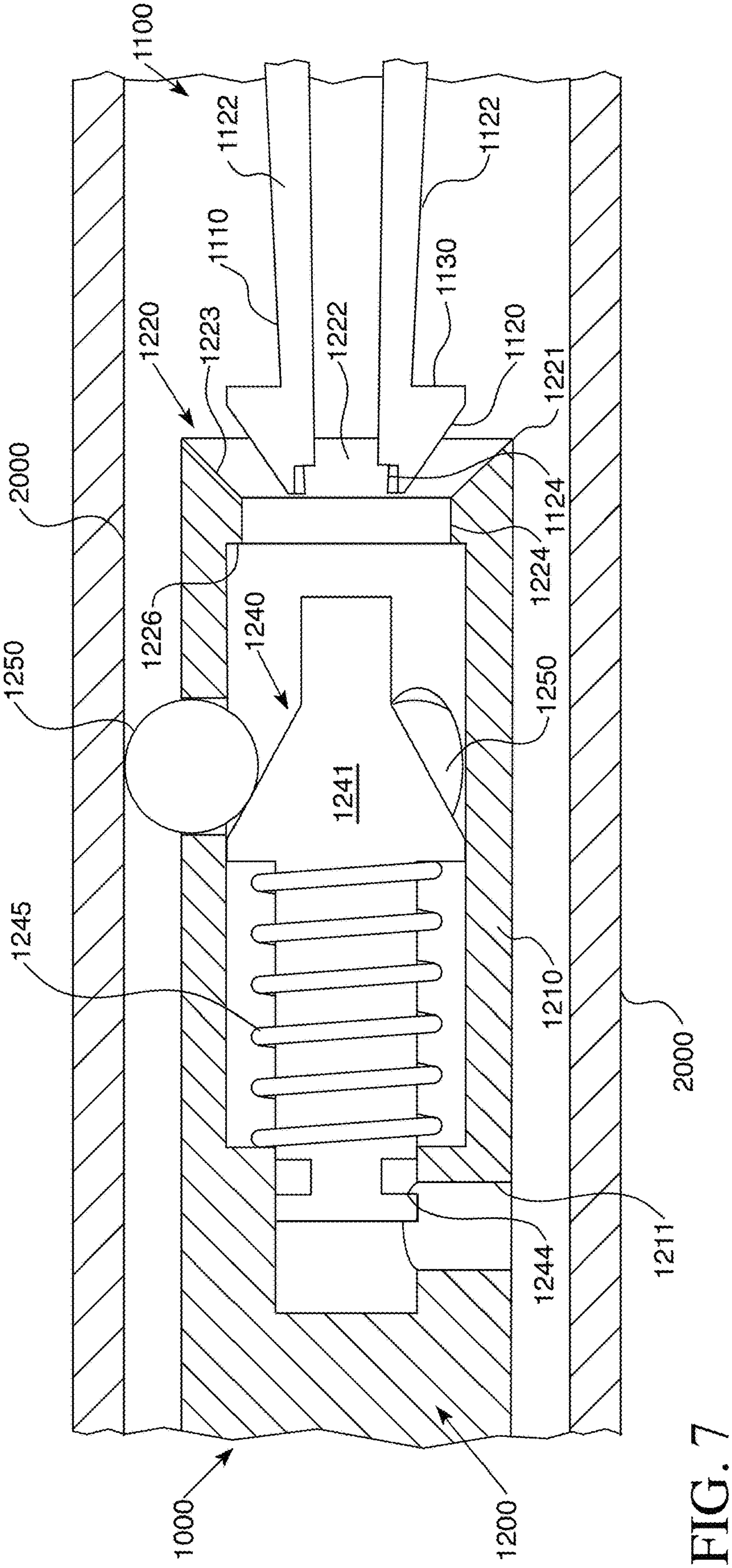
FIG. 7 is a partial cross-sectional schematic representation of a coupling system, in accordance with at least one non-limiting aspect of the present disclosure.
Figure 8:
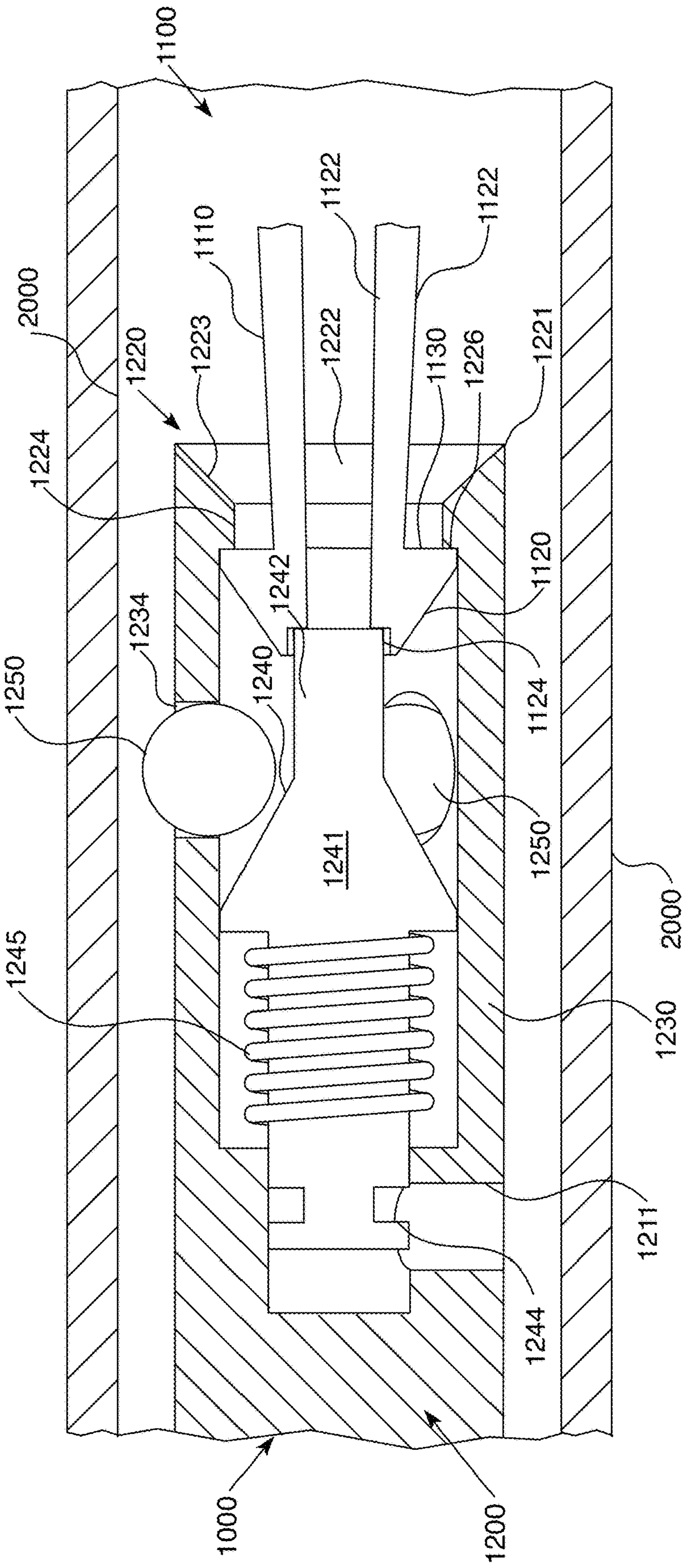
FIG. 8 is a partial cross-sectional schematic representation of a coupling system, in accordance with at least one non-limiting aspect of the present disclosure.

FIGS. 7 and 8 depict partial cross-sectional schematic representations of a coupling system 1000 including a coupling insert 1100 for a transfer system and a coupler 1200 for an irradiation target assembly, in accordance with at least one non-limiting aspect of the present disclosure. FIG. 7 depicts the coupling system 1000 in a disconnected state while FIG. 8 depicts the coupling system 1000 in a fully coupled state. Additionally, FIGS. 7 and 8 depict the coupling system 1000 positioned within a separate outer tube 2000.

The coupling insert 1100 is similar in many respects to other coupling inserts described elsewhere in the present disclosure, which are not repeated herein at the same level of detail for brevity. The coupling insert 1100 includes a distally positioned insertion head 1110 and a proximally positioned receiving end adapted to receive a driven cable assembly of the transfer system. In various examples, the insertion head 1110 includes a tapered section 1120. In some examples, the insertion head 1110 includes a shoulder 1130 having the same diameter as the largest diameter of the tapered section 1120. In certain examples, the insertion head 1110 can be configured as three or more radially compressible, segmented fingers 1122.

In one example, the insertion head 1110 includes a cutout 1124 defining a void therein positioned at the distal end of the insertion head 1110 as shown in FIG. 7. In examples of the insertion head 1110 including a cutout 1124, the insertion head 1110 can optionally include a tip sized to fit within a void defined by the cutout. The optional tip can be configured similarly to the tip 418 as described hereinabove. Although FIG. 7 depicts a compressible configuration of the insertion head 1110, the insertion head 1110 can be configured as an incompressible insertion head having an integrated tip.

The insertion head 1110 can be configured similarly to an insertion head 410 as described hereinabove. Thus, the insertion head 1110 can be configured to be compressed upon being distally advanced through a tapered opening and/or a cylindrical bore hole from a disconnected state. Likewise, upon a further axial advancement of an insertion head 1110, the shoulder of the insertion head 1110 can be adapted to engage a bearing surface in a fully coupled state without decoupling when subjected to a high tensile retracting load. Additionally, the receiving end of the coupling insert 1100 can be configured similarly to a receiving end 420 as described hereinabove. Thus, the receiving end of the coupling insert 1100 can be adapted to couple to an existing ball and socket assembly of a transfer system. Accordingly, a coupling insert 1100 incorporating this configuration can be operated without requiring any particular rotational, or otherwise tedious, manipulations of the coupling insert.

The coupler 1200 is similar in many respects to other couplers described elsewhere in the present disclosure, which are not repeated herein at the same level of detail for brevity. In various examples, the coupler 1200 includes a housing 1210 and a brake assembly 1240. The housing 1210 can include a proximal end 1220, a distal end, and a side section 1230 axially extending between the proximal end 1220 and the distal end. The side section 1230 defines a cavity therein and includes a plurality of side bores 1234 transversely extending into the cavity. The proximal end 1220 includes an opening 1221 having a first diameter and a first interface 1222 distally extending from the opening 1221. In various examples, the first interface 1222 includes a tapered surface 1223 tapering down from the first diameter. In some examples, the proximal end 1220 includes a second interface. In certain examples, the second interface includes an axial bore 1224 having a second diameter, wherein the tapered surface of the first interface 1222 tapers down from the first diameter to a proximal end of the axial bore 1224. In one example, the second interface includes a bearing surface 1226 formed by a radially outward extension of the distal end of the axial bore 1224 of the second interface. The housing 1210 can optionally include a transversely oriented access 1211 axially positioned at the distal end of the cavity defined by the side section.

The housing 1210 can be configured similarly to the housing 100 as described hereinabove. Thus, the housing 1210 can be adapted to align and receive a distally advancing coupling insert 1100. For example, the first diameter of the opening 1221 of the proximal end 1220 can be configured to surround a tapered section of an insertion head 1110 and the first interface 1222 can be configured with a tapered surface to slidably receive and align the tapered insertion head 1110 as depicted in FIG. 7. The first interface 1222 can also be adapted to provide a compression load on a compressible insertion head 1110 upon advancing the insertion head 1110 past the distal end of the first interface. Likewise, the second interface can be adapted to provide a positive locking engagement with the coupling insert 1100 as depicted in FIG. 8. For example, the area of the bearing surface 1226 can be configured to maximize the contact area between the shoulder 1130 and the bearing surface 1226. The distal end of the housing 1210 can also be adapted to removably couple to the irradiation target assembly without compromising a decoupling or range of motion when traversing a bend in the outer tube or an otherwise nonlinear traversal path. Thus, a coupler 1200 incorporating this configuration can be engaged with a mere axial insertion of a coupling insert 1100 therein without compromising the reliability of a connection between an irradiation target assembly and a transfer system during a retraction of the irradiation target assembly.

The brake assembly 1240 includes a plunger 1241 positioned within the cavity of the housing 1210, a spring 1245, and a plurality of braking balls 1250. In various examples, the plunger 1241 includes a proximal shaft, a middle section and a distal shaft, wherein the proximal shaft and the distal shaft are configured to axially extend from the middle section. The proximal end of the proximal shaft is accessible through the opening 1221. In some examples, the spring 1245 is positioned around the distal shaft. In certain examples, the spring 1245 is a helical compression spring. The distal end of the plunger 1241 can optionally include a holding interface 1244. A holding tool can be inserted through the transversely oriented access 1211 to facilitate assembly and/or disassembly of the coupler 1200 outside of the transfer system by maintaining a compressed state of the spring 1245.

The brake assembly 1240 can be configured similarly to the inner assembly 200, as described hereinabove. For example, the plunger 1241 can be configured similarly to the actuator body 210. Thus, the plunger 1241 can be adapted to convert a net axial force into a transverse force in a default state of the plunger 1241. For example, the middle section of the plunger 1241 can be configured to receive a default force provided by the spring 1245, to thereby exert an outward transverse force onto a body in contact therewith as depicted in FIG. 7. Additionally, the proximal shaft of the plunger 1241 can be engaged and pushed by advancing an insertion head 1110 through the opening 1221 to provide a secondary axial force in opposition to the default force on the plunger 1241, thereby deforming the spring 1245 and releasing the plunger 1241 from the default state. In this configuration, the plunger 1241 will automatically return to the default state upon removing the secondary axial force. Thus, a brake assembly 1240 incorporating this configuration can automatically assume a default state to provide a transverse force, while the default state can be released as desired by a simple insertion of a coupling insert 1100 to reversibly deform the spring 1245.

Additionally, the plurality of braking balls 1250 can be configured similarly to the plurality of friction members 300, as described hereinabove. Thus, the plurality of braking balls 1250 can be adapted to be outwardly driven into contact with the inner wall of an outer tube 2000 by the middle section of a plunger 1241 through the plurality of side bores of the housing 1210, as depicted in FIG. 7. Furthermore, the coupler 1200 can be adapted to automatically immobilize itself within the outer tube 2000 when disconnected from the coupling insert 1100. For example, the spring 1245 can be configured to exert a sufficient default force onto the plunger 1241 for driving the plurality of braking balls 1250 into the inner wall of an outer tube 2000 with a transverse braking force. The transverse braking force can be configured to provide enough friction between the plurality of braking balls 1250 and the outer tube 2000 to overcome the weight of the coupler 1200 and an irradiation target assembly attached to the distal end of the coupler 1200, thereby providing an automatic self-braking action. Thus, a brake assembly 1240 incorporating this configuration can provide an automatic self-braking action to immobilize the coupler Since the release of the default state is dependent on the proximal shaft of the plunger 1241 receiving a secondary axial force, the insertion head 1110 can be configured with an insertion depth sufficient to push on the proximal shaft of the plunger 1241 without engaging the bearing surface 1226 to avoid a positive lock of the insertion head 1110 within the housing 1210. Although FIG. 8 depicts a positively locked insertion head 1110 engaging the proximal shaft 1242, the insertion head 1110 can be configured with a longer maximum insertion depth to release the default plunger state prior to reaching a fully coupled state as shown in FIG. 8. For example, a compressible tapered insertion head 1110 incorporating a removable tip, or an incompressible tapered insertion head 1110 with an integrated tip, can be advanced into the opening 1221 to engage the tapered surface 1223 and push on the proximal shaft of the plunger 1241 without requiring a distal advancement of the insertion head 1110 past the distal end of the first interface 1222. A coupler incorporating this configuration can be employed to advance an irradiation target assembly through an outer tube without establishing a positive lock between the insertion head 1110 and the housing 1210, thereby facilitating a retraction of a coupling insert 1100 without compromising the positioning of the coupler and/or an irradiation target insert attached thereto upon retracting the coupling insert 1100.

A coupler 1200 incorporating a brake assembly 1240 configured to provide an automatic self-braking action can maintain a positioning of an irradiation target assembly within a flux thimble tube and/or a guide tube of a transfer system, without requiring the support of any other attachments. Moreover, the brake assembly 1240 and the coupling insert 1100 can be configured to utilize simple axial motions to facilitate a repeatable release of the braking balls 1250 and/or a retraction of the coupler 1200. Thus a coupling system 1000 can provide an advantage over other systems for transferring irradiation targets by providing the benefits of increased operator safety without compromising the neutron flux delivered to the irradiation target and/or risking a decoupling during a transfer operation.

Figure 9:
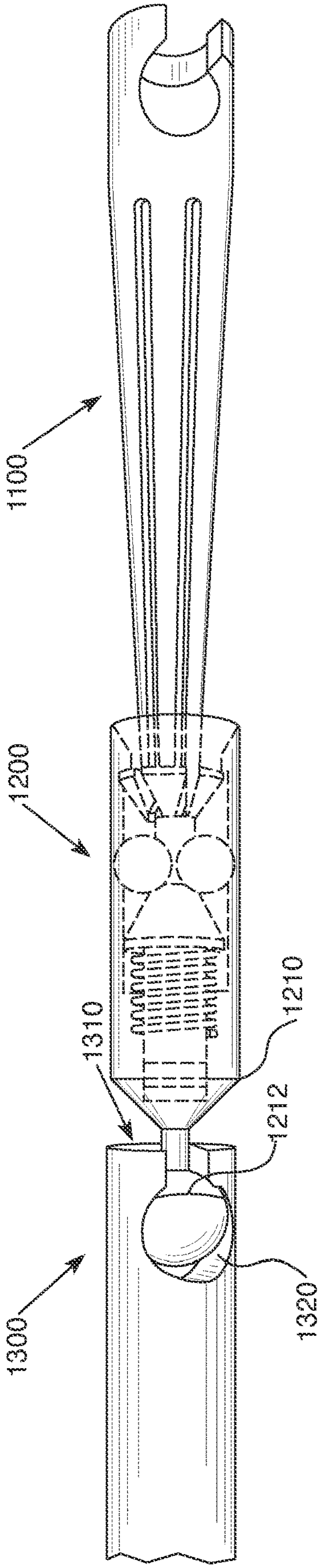
FIG. 9 is a graphic representation of a coupling system, in accordance with at least one non-limiting aspect of the present disclosure.

FIG. 9 depicts a graphic representation of a coupling system 1000 including a coupling insert 1100, a coupler 1200 and an irradiation target assembly 1300, in accordance with at least one non-limiting aspect of the present disclosure. The irradiation target assembly 1300 includes a socket 1310 for removably coupling to the interface 1212 of the distal end of the housing 1210. In various examples, the socket 1310 is configured to retain the interface 1212 under any axial load. In some examples, the interface 1212 is configured as a ball for a ball and socket assembly. In certain examples, the socket 1310 includes a transverse cutout 1320. The profile of the transverse cutout 1320 can be configured to be substantially the same as, or slightly larger than, the axial cross-section geometry of the interface 1212 of the distal end of the housing 1210. In this configuration, the interface 1212 can follow a substantially transverse path into and/or out of the socket 1310 to facilitate an assembly and/or disassembly of the irradiation target assembly 1300 and the coupler 1200 in a remote location outside of the transfer system and/or flux thimble tube. When the housing 1210 and the irradiation target assembly 1300 are assembled and inserted into an outer tube, the outer tube substantially limits any axial misalignment required to transversely decouple the housing and the irradiation target assembly.

Various aspects of the present disclosure include, but are not limited to, the aspects listed in the following numbered clauses.

Clause 1—A coupler for connecting an irradiation target assembly to a transfer system, the coupler comprising a housing adapted to be inserted into an outer tube and an inner assembly. The housing comprises a proximal end, the proximal end comprising an opening; a distal end, the distal end comprising an interface adapted to removably couple to the irradiation target assembly; and a side section defining a cavity therein. The side section axially extends between the proximal end and the distal end and further comprises a plurality of side bores, wherein the plurality of side bores extend into the cavity. The inner assembly comprises an actuator body positioned within the cavity defined by the side section of the housing; a return member for exerting a default axial force on the actuator body; and a plurality of friction members configured to be transversely driven by the actuator body through the plurality of side bores. The actuator body further comprises a first section, a second section and a middle section, wherein each of the sections of the actuator body are axially aligned with the housing, wherein the first section axially extends from the middle section in a first direction, and wherein the second section axially extends from the middle section in a second direction opposing the first direction.

Clause 2—The coupler of clause 1, wherein the outer tube is a guide tube of the transfer system, a flux thimble tube, or a combination thereof.

Clause 3—The coupler of any one of clauses 1-2, wherein the interface comprises a head and a shank, wherein the head comprises a substantially spherical section.

Clause 4—The coupler of any one of clauses 1-3, wherein the plurality of friction members comprises a ball.

Clause 5—The coupler of any one of clauses 1-4, wherein the actuator body is adapted to receive a net axial force comprising the default axial force, wherein the default axial force is oriented in the first direction and wherein the middle section of the actuator body is adapted to impart a transverse force based at least on the net axial force on each of the plurality of friction members.

Clause 6—The coupler of clause 5, wherein the transverse force comprises a radial component, and wherein the magnitude of the radial component is adapted to drive each of the plurality of friction members into contact with an inner wall of the outer tube.

Clause 7—The coupler of clause 6, wherein the contact between each of the plurality of friction members and the inner wall of the outer tube immobilizes the coupler at an axial position within the outer tube.

Clause 8—The coupler of any one of clauses 5-7, wherein the net axial force is greater than or equal to a threshold force oriented in the first direction.

Clause 9—The coupler of clause 8, wherein the threshold force is based in part on the weight of the irradiation target assembly.

Clause 10—The coupler of any one of clauses 5-9, wherein the middle section comprises a tapered section, wherein a displacement of the middle section in the first direction drives each of the plurality of friction members towards the outer tube.

Clause 11—The coupler of clause 10, wherein the first section of the actuator body proximally extends from the middle section of the actuator body and the second section of the actuator body distally extends from the middle section.

Clause 12—The coupler of clause 11, wherein the actuator body is a plunger comprising a proximal shaft and a distal shaft, wherein the proximal shaft and the distal shaft axially extend from the middle section, and wherein the proximal shaft of the plunger is accessible through the opening of the proximal end of the housing.

Clause 13—The coupler of any one of clauses 1-12, wherein the return member comprises a spring adapted to provide the default axial force, wherein the spring is positioned within the cavity, and wherein a first end of the spring is coupled to the housing and a second end of the spring is coupled to the actuator body.

Clause 14—The coupler of any one of clauses 1-13, wherein the opening of the proximal end of the housing comprises a diameter adapted to surround a coupling insert of the transfer system.

Clause 15—The coupler of clause 14, wherein the opening of the proximal end comprises an intermediate region, the intermediate region comprising a first interface adapted to slidably receive an advancing coupling insert of the transfer system.

Clause 16—The coupler of clause 15, wherein the intermediate region of the housing comprises a second interface adapted to positively lock a retracting coupling insert of the transfer system.

Clause 17—A coupling system for transferring an irradiation target assembly through an outer tube, the coupling system comprising a coupling insert for a transfer system and a coupler for an irradiation target assembly. The coupling insert comprises an insertion head and a receiving end adapted to receive a driven cable assembly of the transfer system. The coupler comprises a housing and a brake assembly. The housing further comprises a proximal end comprising an opening having a first diameter adapted to surround the insertion head and a first interface, wherein the first interface is adapted to slidably receive the insertion head; a distal end, the distal end comprising an interface adapted to removably couple to the irradiation target assembly; and a side section defining a cavity therein, the side section comprising a plurality of side bores transversely extending into the cavity, wherein the side section axially extends between the proximal end and the distal end. The brake assembly further comprises a plunger positioned within the cavity, the plunger comprising a proximal shaft, a distal shaft, and a middle section, wherein the proximal shaft and the distal shaft axially extend from the middle section, and wherein the proximal shaft of the plunger is accessible through the opening of the proximal end of the housing; a spring positioned around the distal shaft of the plunger, wherein the spring is adapted to exert a default force on the plunger; and a plurality of braking balls, wherein the braking balls are adapted to be outwardly driven by the plunger into the outer tube, wherein the plunger is adapted to exert a transverse force on the plurality of braking balls based on the default force. The brake assembly is adapted to provide an immobilizing transverse force to the plurality of braking balls based on the default force and the immobilizing transverse force is adapted to maintain an axial position of the coupler within the outer tube.

Clause 18—The coupling system of clause 17, wherein the first interface comprises a tapered surface tapering down from the first diameter of the opening of the proximal end of the housing, and wherein the insertion head comprises a tapered section configured to complement at least a portion of the tapered surface of the first interface upon distally advancing the insertion head into the first interface.

Clause 19—The coupling system of clause 18, wherein the housing comprises a second interface comprising an axial bore and a bearing surface. The axial bore further comprises a second diameter less than the first diameter of the opening of the proximal end of the housing. The tapered surface of the first interface tapers down from the first diameter of the opening of the proximal end of the housing to a proximal end of the axial bore and a distal end of the axial bore extends radially outward to form the bearing surface.

Clause 20—The coupling system of clause 19, wherein the insertion head comprises a shoulder adapted to engage the bearing surface of the second interface after advancing the tapered section of the insertion head past the distal end of the axial bore.

Various features and characteristics are described in this specification to provide an understanding of the composition, structure, production, function, and/or operation of the present disclosure, which includes the disclosed methods and systems. It is understood that the various features and characteristics of the present disclosure described in this specification can be combined in any suitable manner, regardless of whether such features and characteristics are expressly described in combination in this specification. The Inventors and the Applicant expressly intend such combinations of features and characteristics to be included within the scope of the present disclosure described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a method or system that "comprises," "has," "includes," or "contains" a feature or features and/or characteristics possesses the feature or those features and/or characteristics but is not limited to possessing only the feature or those features and/or characteristics. Likewise, an element of a composition, coating, or process that "comprises," "has," "includes," or "contains" the feature or features and/or characteristics possesses the feature or those features and/or characteristics but is not limited to possessing only the feature or those features and/or characteristics and may possess additional features and/or characteristics.

The grammatical articles "a," "an," and "the," as used in this specification, including the claims, are intended to include "at least one" or "one or more" unless otherwise indicated. Thus, the articles are used in this specification to refer to one or more than one (i.e., to "at least one") of the grammatical objects of the article. By way of example, "a component" means one or more components and, thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

As used in this specification, particularly in connection with layers, the terms "on," "onto," "over," and variants thereof (e.g., "applied over," "formed over," "deposited over," "provided over," "located over," and the like) mean applied, formed, deposited, provided, or otherwise located over a surface of a substrate but not necessarily in contact with the surface of the substrate. For example, a layer "applied over" a substrate does not preclude the presence of another layer or other layers of the same or different composition located between the applied layer and the substrate. Likewise, a second layer "applied over" a first layer does not preclude the presence of another layer or other layers of the same or different composition located between the applied second layer and the applied first layer.

Whereas particular examples of this disclosure have been described above for purposes of illustration, it will be evident to those skilled in the art that numerous variations of the details of the present disclosure may be made without departing from the present disclosure as defined in the appended claims.

What is claimed is:

1. A coupler for connecting an irradiation target assembly to a transfer system, the coupler comprising:
- a housing adapted to be inserted into an outer tube, the housing comprising:
  - a distal end, the distal end comprising an interface adapted to removably couple to the irradiation target assembly;
  - a proximal end, the proximal end comprising an opening; and
  - a side section defining a cavity therein, the side section comprising a plurality of side bores, wherein the side section axially extends between the proximal end and the distal end, and wherein the plurality of side bores extend into the cavity; and
- an inner assembly comprising:
  - an actuator body, wherein the actuator body is positioned within the cavity, the actuator body comprising a first section, a second section and a middle section, wherein each of the sections of the actuator body are axially aligned with the housing, wherein the first section axially extends from the middle section in a first direction, and wherein the second section axially extends from the middle section in a second direction opposing the first direction;
  - a return member for exerting a default axial force on the actuator body; and
  - a plurality of friction members configured to be transversely driven by the actuator body through the plurality of side bores.

2. The coupler as claimed in claim 1, wherein the outer tube is a guide tube of the transfer system, a flux thimble tube, or a combination thereof.

3. The coupler as claimed in claim 1, wherein the interface comprises a head and a shank, wherein the head comprises a spheroidal or spherical section.

4. The coupler as claimed in claim 1, wherein the plurality of friction members comprises a ball.

5. The coupler as claimed in claim 1, wherein the actuator body is adapted to receive a net axial force comprising the default axial force, wherein the default axial force is oriented in the first direction and wherein the middle section of the actuator body is adapted to impart a transverse force based at least on the net axial force on each of the plurality of friction members.

6. The coupler as claimed in claim 5, wherein the transverse force comprises a radial component, and wherein the magnitude of the radial component is adapted to drive each of the plurality of friction members into contact with an inner wall of the outer tube.

7. The coupler as claimed in claim 6, wherein the contact between each of the plurality of friction members and the inner wall of the outer tube immobilizes the coupler at an axial position within the outer tube.

8. The coupler as claimed in claim 7, wherein the net axial force is greater than or equal to a threshold force oriented in the first direction.

9. The coupler as claimed in claim 8, wherein the threshold force is based in part on the weight of the irradiation target assembly.

10. The coupler as claimed in claim 5, wherein the middle section comprises a tapered section, wherein a displacement of the middle section in the first direction drives each of the plurality of friction members towards the outer tube.

11. The coupler as claimed in claim 10, wherein the first section of the actuator body proximally extends from the middle section of the actuator body and the second section of the actuator body distally extends from the middle section.

12. The coupler as claimed in claim 11, wherein the actuator body is a plunger comprising a proximal shaft and a distal shaft, wherein the proximal shaft and the distal shaft axially extend from the middle section, and wherein the proximal shaft of the plunger is accessible through the opening of the proximal end of the housing.

13. The coupler as claimed in claim 1, wherein the return member comprises a spring adapted to provide the default axial force, wherein the spring is positioned within the cavity, and wherein a first end of the spring is configured to contact the housing and a second end of the spring is configured to contact the actuator body.

14. The coupler as claimed in claim 1, wherein the opening of the proximal end of the housing is configured to surround a coupling insert of the transfer system.

15. The coupler as claimed in claim 14, wherein the proximal end comprises an intermediate region, the intermediate region comprising a first interface adapted to receive an advancing coupling insert of the transfer system.

16. The coupler as claimed in claim 15, wherein the intermediate region of the proximal end comprises a second interface adapted to positively lock a retracting coupling insert of the transfer system.

17. A coupling system for transferring an irradiation target assembly through an outer tube, the coupling system comprising:

a coupling insert for a transfer system, the coupling insert comprising:

an insertion head; and a receiving end adapted to receive a driven cable assembly of the transfer system; and a coupler for an irradiation target assembly, the coupler comprising:

a housing, the housing comprising:

a proximal end comprising an opening having a first diameter adapted to surround the insertion head and a first interface, wherein the first interface is adapted to slidably receive the insertion head;

a distal end, the distal end comprising an interface adapted to removably couple to the irradiation target assembly; and a side section defining a cavity therein, the side section comprising a plurality of side bores transversely extending into the cavity, wherein the side section axially extends between the proximal end and the distal end; and a brake assembly, the brake assembly comprising:

a plunger positioned within the cavity, the plunger comprising a proximal shaft, a distal shaft, and a middle section, wherein the proximal shaft and the distal shaft axially extend from the middle section, and wherein the proximal shaft of the plunger is accessible through the opening of the proximal end of the housing;

a spring positioned around the distal shaft of the plunger, wherein the spring is adapted to exert a default force on the plunger; and a plurality of braking balls, wherein the braking balls are adapted to be outwardly driven by the plunger into the outer tube, wherein the plunger is adapted to exert a transverse force on the plurality of braking balls based on the default force;

wherein the brake assembly is adapted to provide an immobilizing transverse force to the plurality of braking balls based on the default force, wherein the immobilizing transverse force is adapted to maintain an axial position of the coupler within the outer tube.

18. The coupling system as claimed in claim 17, wherein the first interface comprises a tapered surface tapering down from the first diameter, and wherein the insertion head comprises a tapered section configured to complement at least a portion of the tapered surface upon distally advancing the insertion head into the first interface.

19. The coupling system as claimed in claim 18, wherein the housing comprises a second interface, the second interface comprising an axial bore and a bearing surface, wherein:

the axial bore comprises a second diameter less than the first diameter;

the tapered surface of the first interface tapers down from the first diameter to a proximal end of the axial bore; and a distal end of the axial bore extends radially outward to form the bearing surface.

20. The coupling system as claimed in claim 19, wherein the insertion head comprises a shoulder adapted to engage the bearing surface of the second interface when the tapered section of the insertion head is advanced past the distal end of the axial bore.

* * * * *